United States Patent [19]
Walter, Jr.

[11] 3,826,575
[45] July 30, 1974

[54] HIGH PERFORMANCE RING LASER GYROSCOPE WITH MAGNETO-OPTICAL BIAS

[75] Inventor: John F. Walter, Jr., Columbia, Md.

[73] Assignee: The United States of America as represented by the Secretary of the Navy, Washington, D.C.

[22] Filed: June 25, 1973

[21] Appl. No.: 373,212

[52] U.S. Cl. .......................................... 356/106 LR
[51] Int. Cl. ............................................. G01b 9/02
[58] Field of Search ............................ 356/106 LR

[56] References Cited
UNITED STATES PATENTS

| | | | |
|---|---|---|---|
| 3,373,650 | 3/1968 | Killpatrick | 356/106 LR |
| 3,468,608 | 9/1969 | Doyle | 356/106 LR |
| 3,600,095 | 8/1971 | Tanaka | 356/106 LR |

*Primary Examiner*—Vincent P. McGraw

[57] ABSTRACT

A ring laser gyroscope capable of producing an output signal at low rates of angular rotation. A differential magneto-optical bias system eliminates the requirement of extreme stability in the bias system.

9 Claims, 2 Drawing Figures

HIGH PERFORMANCE RING LASER GYROSCOPE WITH MAGNETO-OPTICAL BIAS

BACKGROUND OF THE INVENTION

The present invention relates generally to ring lasers and more particularly to ring lasers which may be used as gyroscopes or angular rotational rate sensors, and even more particularly to ring laser gyroscopes having a bias system to prevent zero output at low angular rates.

Ring lasers are now generally well-known and are principally used as rotational rate sensors or gyroscopes. The "ring" is actually a closed-loop resonant cavity laser having two beams of light travelling around the cavity in opposite directions. These two laser beams will normally form a degenerative pair having the same frequency; however, upon the occurrence of a disturbance to the cavity the beam path lengths will differ and a beat signal will be produced when the two signals are properly combined. When the disturbance is angular rotation about an axis perpendicular to the plane of the cavity, the frequency of the beat signal will indicate the rotational rate of the disturbance being applied to the cavity.

This method of measuring rotational rate works quite well provided the rotational rate is relatively large; however, when the rate becomes small, all ring lasers experience what is called mode lock-in. This condition is indicated by the inability of the two counter-rotating beams to produce a beat signal. This inability may exist for a variety of reasons although back scattering of light produced within the cavity is the predominant cause. Lock-in will occur, i.e., the frequency of the beat signal will go to zero at low rotational rates, in either direction of rotation, clockwise or counter-clockwise. Various schemes have been proposed, and some are currently being used, to prevent this mode lock-in condition by biasing the laser so that it operates outside of this low rotational rate area. One bias method is to impart either a constant or an oscillatory mechanical rotation to the system. Another bias method is to impart an effective rotation to the system through the use of certain optical devices which have the same desired effect as mechanical rotation of the system and which can be either of a constant or oscillatory nature.

One form of constant bias system might provide bias by magneto-optical effects such as the wellknown Faraday cell. The major drawback in the use of constant bias systems is the necessity for long-term stability, i.e., the bias rate must be held very stable in order to preserve the accuracy of the ring laser gyroscope. To illustrate this extreme stability requirement, assume that the output of a ring laser gyroscope, which for large angular rates would lie outside of the lock-in region, is given by:

$$\dot{\psi} = K_o (\Omega + \Omega_{BO})$$

1.

where $K_o$ is the scale factor, $\Omega$ is the angular rate to be measured, and $\Omega_{BO}$ is the effective bias rate being supplied by the constant bias system. If we arbitrarily select a bias such as, $\Omega_{BO} = 300°/\text{second}$, and try to measure a rotational rate which would otherwise lie within the lock-in region, say, $\Omega = 0.01°/\text{hour}$, a simple calculation will show that the bias rate must be absolutely stable to better than one part in $10^8$. If a magneto-optical bias device such as a Faraday cell was providing the constant bias, then the current through the coil of the Faraday cell would be required to be stable within one part in $10^8$. Obviously such stability requirements are unreasonable from a practical standpoint.

It is therefore an object of the present invention to provide a bias system which will allow a ring laser gyroscope to operate outside of the lock-up region.

It is a further object of this invention to provide a bias system of the constant type which will allow a ring laser gyroscope to produce an output signal at low rates of angular rotation.

It is a further object of this invention to provide a constant bias system comprised of a magneto-optical bias device.

It is still a further object of this invention to provide a differential constant bias system comprised of a magneto-optical bias device which will not be bound by extreme stability requirements.

SUMMARY OF THE INVENTION

To provide a bias system which is not subject to an extreme stability requirement the invention proposes a differential bias system. Such differential bias system consists of two ring lasers having laser cavities located in the same plane and biased in opposite directions by the same magneto-optical bias device. When the two ring lasers are arranged in this manner the output of one of the two will be given as before by:

$$\dot{\psi} = K_o (\Omega + \Omega_{BO})$$

2.

However, since the second laser will then be biased in the opposite direction by the same device, the output of the second ring laser will be given by:

$$\dot{\psi} = K_o (\Omega - \Omega_{BO})$$

3.

Therefore, summing the outputs of the two ring lasers we get:

$$\dot{\psi}_T = 2 K_o \Omega$$

4.

This output is then independent of the bias rate $\Omega_{BO}$.

Magneto-optical bias may be achieved by using certain substances which rotate the polarization plane of polarized light passing through them. Quartz, for example, which does not normally have this rotational property, acquires it when placed in a strong magnetic field. For quartz or a similar substance, the rotation for a given wavelength of light is proportional to the magnetic field intensity. However, given a field of fixed intensity, every light transmissive material will produce a different amount of rotation, this quality is generally indicated by a number called a Verdet constant. For a ferromagnetic substance the amount of rotation is proportional to the magnetization, as opposed to the magnetic field intensity. A common device for achieving magneto-optical bias is the Faraday cell, which consists of two quarter-wave plates which enclose an optical medium with a relatively large Verdet constant. This optical medium is then surrounded by an electromagnet or a permanent magnet to produce the necessary magnetic field intensity. In the instant invention the clockwise and counter clockwise beams of each individual ring laser are not caused to follow the exact same path through the bias element, but rather, are kept separate by a distance approximately equal to one light beam radius or greater.

DESCRIPTION OF THE PREFERRED EMBODIMENT

Figure 1:
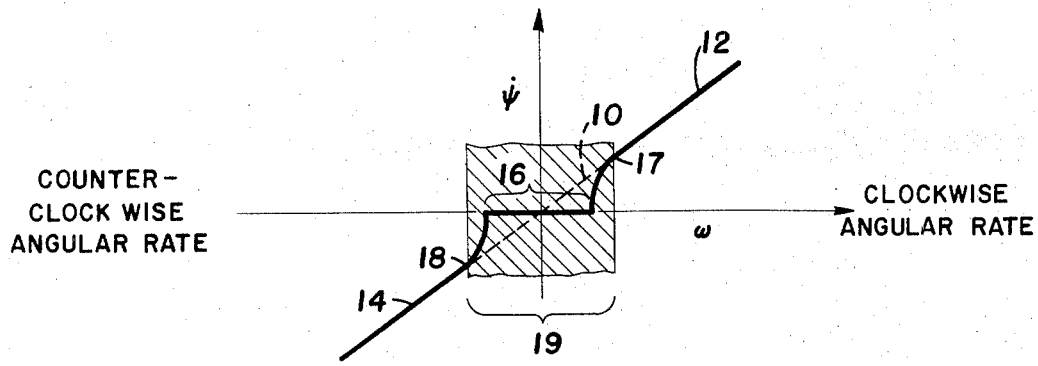
FIG. 1 is a graph plotting output versus input of a typical ring laser rotational rate sensor.

Referring now to FIG. 1 the response of a typical ring laser is illustrated. The abscissa axis $\omega$ represents the rate of angular rotation, usually in degrees per second, about an axis which is normal to the plane of the ring laser. Since the angular rotation may be either in the clockwise or counter clockwise direction the part of the abscissa to the right of the origin usually represents clockwise rotation and the part to the left of the origin represents counter clockwise rotation. The ordinate axis $\psi$ represents the ring laser output which has a pulse rate indicative of the rotational rate of the ring laser cavity.

In an ideal ring laser the output response is a linear function passing through or near the origin, this is shown by the dashed line 10. However, as previously mentioned, in the real world the response of a ring laser is degraded at low rates of angular rotation. For a clockwise angular rate the output 12 remains essentially at zero then becomes non-linear before gradually becoming linear. Likewise for a counter-clockwise angular rate the output 14 remains at zero, then goes non-linear before gradually becoming linear. In FIG. 1, that region of the response curve encompassing the zero output portion 16 and extending between the points 17 and 18 where the output responses 12 and 14 achieve linearity is the so-called lock-in region 19. Biasing means are provided by the present invention to allow a ring laser to operate outside of the lock-in region 19 in the linear portions 12 and 14 of its response curve, thereby enabling the gyroscope to produce an output signal even for small angular rotational rates.

Figure 2:
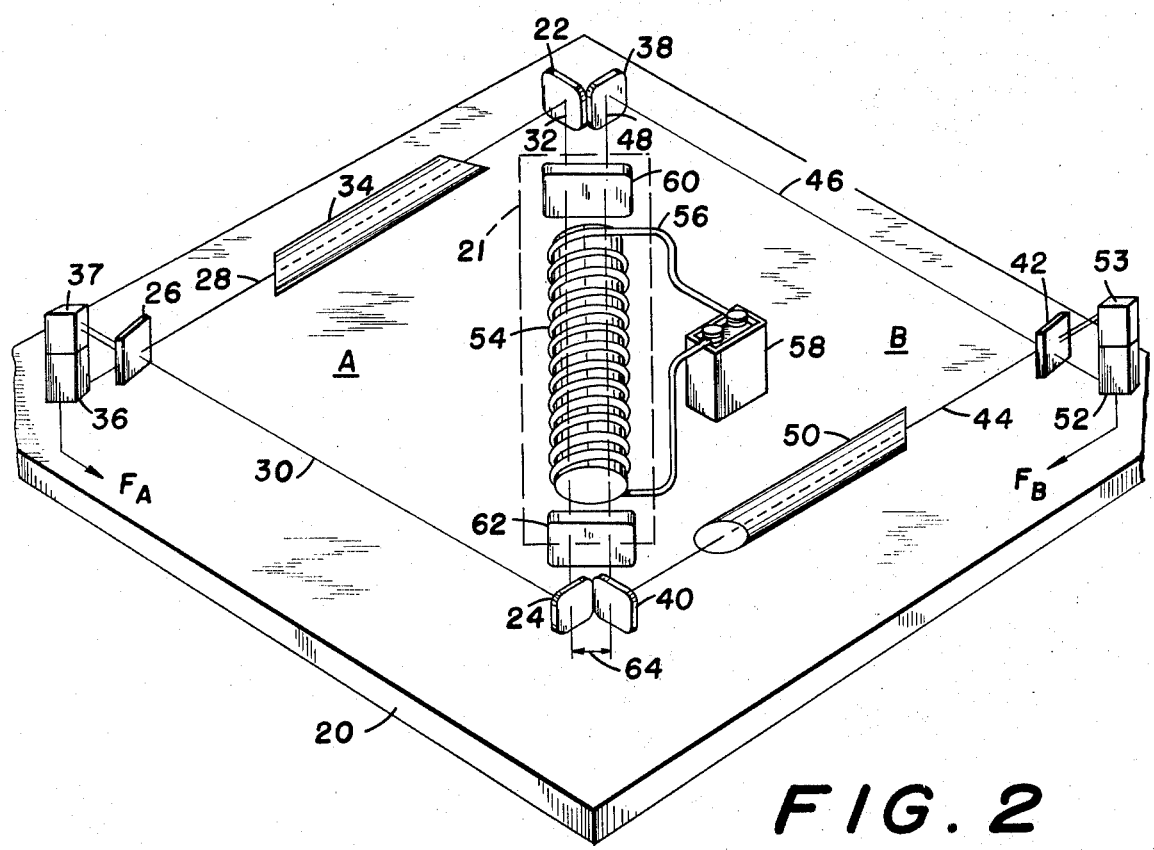
FIG. 2 is a simplified diagram of an embodiment of the invention utilizing a Faraday cell as the biasing element.

Referring now to FIG. 2, two conventional ring lasers having laser cavities A and B formed by an odd number of beam paths are shown located in the same plane and affixed to an appropriate mounting plate 20. These laser cavities are pictured utilizing a single differential biasing unit, which is shown in this embodiment as a Faraday cell 21. The first ring laser cavity A is made up of three mirrors 22, 24, and 26 forming three light beam paths 28, 30, and 32. An active lasing medium 34, such as a conventional gas lasing medium, is placed in beam path 28 and supports two beams of light travelling in opposite directions along paths 28, 30 and 32. Two of the mirrors 22 and 24 are fully reflective, while the third mirror 26 is only partially reflective and is positioned in paths 28 and 30 such that a portion of both the clockwise and counter-clockwise light beams are directed to a photodetector 36 of a well-known type. A conventional retrodirective mirror or retroreflector 37 may be used to accomplish this. The conventional photodetector 36 will provide a signal $F_A$ having a frequency related to the angular rate of rotation of the ring laser A. The second ring laser cavity B, also made up of three mirrors 38, 40, and 42 forming three light beam paths 44, 46, and 48 is located in the plane described by the first ring laser cavity A and is also affixed to the mounting plate 20. A second active lasing medium 50 is inserted in beam path 44 and supports two beams of light travelling in opposite directions along beam paths 44, 46 and 48. Two of the mirrors 38 and 40 reflect all the light impinging upon them, while the third mirror 42 allows some light to be transmitted, i.e., it is partially reflective. This partially reflective mirror 42 is positioned in paths 44 and 46 such that a portion of both the clockwise and counter-clockwise light beams are directed to a second photodetector 52 of a well-known type. Again, a conventional retrodirective mirror or retroreflector 53 is utilized to accomplish this. The photodetector 52 also will produce a signal $F_B$ having a frequency which corresponds to the angular rate of rotation of the ring laser cavity B. The Faraday biasing cell 20 which is located both in beam path 32 of laser cavity A and in beam path 48 of laser cavity B provides the biasing component denoted as $\Omega_{BO}$ in equation (1). The Faraday cell 20 is comprised of an optical medium 54, such as flint glass, having a relatively large Verdet constant, which is located inside a wire coil 56. The wire coil 56 is connected to any suitable D.C. voltage source such as a battery 58, thereby forming an electro-magnet. The optical medium 54 is enclosed by locating two quarter-wave plates 60 and 62 of the conventional type at either end. The two beam paths 32 and 48 are separated by a short distance 64 approximately one light beam radius which is normally about 0.3 mm or greater.

The placement of these components in relation to each other is most important to practicing the present invention. Since a ring laser only detects angular rotation about an axis perpendicular to the plane of the laser cavity, it can be seen that laser cavities A and B must both be located in the same plane. In other words, if the laser cavities A and B are not in the same plane, the differential bias approach will still be effective, but the output signals will not indicate the true angular rotation rate. In that case, the output signals from laser cavities A and B would indicate only the angular rotation component that is perpendicular to the plane of the individual cavities. It should also be obvious now, that were the rotational motion to be imparted about an axis parallel to the plane of the laser cavities, no output signals would be produced. The embodiment of FIG. 2 illustrates that not only must the coplanar requirement of the two laser cavities A and B be met, but also that the cavities must be located adjacent to each other so that a single bias unit, an optical bias element 21, may operate simultaneously on the light beams of both cavities A and B. Since there are two ring laser cavities placed so that their respective clockwise and counter-clockwise light beams pass through the bias unit 21 in different directions this bias unit 21 accomplishes the differential approach taught by the invention.

To further illustrate this differential approach, upon the appropriate energizations of the two lasing mediums 34 and 50 and the differential biasing unit 21, and while the entire system, i.e., all components affixed to mounting plate 20, is undergoing angular rotation about an axis perpendicular to the laser cavity plane, the following output signals will be produced. Laser cavity A in conjunction with the photodetector 36 and retroreflector 37 will produce an output signal $F_A$ which could be represented by equation (2) above.

Similarly, laser cavity B in conjunction with the photodetector 52 and retroreflector 53 will produce an output signal $F_B$ which could be represented by equation (3) above. The signal produced by the sum of these two signals would then be given by equation (4), which is free of the bias term and hence independent of the aforementioned constant bias stability requirement.

It should be understood that the details of the foregoing embodiment are set forth by way of example only. Any type of lasing medium might be used and any type of photodetector-retroreflector combination may be used to measure the interference between the two light beams. A Faraday cell is shown as a magneto-optical rotation device only because it is a well-known example of such device, however, any suitable magneto-optical or electro-optical bias device could be used. Accordingly, it is contemplated that this invention not be limited by the particular details of the embodiment as shown except as defined in the appended claims.

What is claimed is:

1. A ring laser rotational rate sensor having a differential bias system to prevent low angular rate lock-in, comprising:
   a first laser cavity forming a closed loop path containing a lasing medium in said closed loop path for producing a first pair of counter-rotating light beams in said path,
   a second laser cavity located in the plane described by said first laser cavity forming a second closed loop path containing a second lasing medium in said second closed loop path for producing a second pair of counter-rotating light beams in said path with at least one light beam of each of said first and second closed loop paths being substantially parallel and separated by short distance,
   means for producing magneto-optical rotation of light beams disposed to have said parallel light beams pass therethrough, and
   first and second photodetector and retroreflector means receiving respectively said first and second laser cavity light beam pair for producing outputs corresponding respectively to frequency differences between said first and second pair of counter-rotating light beams, said outputs indicating angular rotation of said first and second laser cavities about an axis perpendicular to said plane.

2. The apparatus of claim 1 wherein the light beams passing through said magneto-optical rotation means are separated by a distance at least equal to or greater than the diameter of one of said light beams.

3. The apparatus of claim 2 wherein said means for producing magneto-optical rotation of said light beams is a Faraday cell.

4. The apparatus of claim 3 wherein said Faraday cell comprises an optical medium having a large Verdet constant.

5. The apparatus of claim 1 wherein each of said first and second output producing means comprises a photodetector and a retroreflector both disposed outside of the associated laser cavity, and
   a reflecting surface in each of said first and second laser cavities is partially reflective and transmits a portion of said light beams to the photodetector for that cavity via said retroreflector.

6. A ring laser rotational rate sensor having a stable differential bias system to prevent low angular rate lock-in, comprising,
   a pair of closed-loop laser cavities disposed adjacent to one another in the same plane with at least one light path of one cavity parallel to but separated from one light path of the other cavity,
   magneto-optical bias means disposed to have said parallel light paths pass therethrough, and
   a pair of detection means cooperating with said pair of laser cavities for producing output signals upon detecting frequency differences present in said pair of laser cavities, said output signals being indicative of rotation of said laser cavities plane.

7. The apparatus of claim 6 wherein said parallel light paths are separated by at least one laser light beam diameter.

8. The apparatus of claim 7 wherein said magneto-optical bias means comprises a Faraday cell having a large Verdet constant.

9. The apparatus of claim 8 wherein said pair of detection means are located external to said pair of laser cavities.

* * * * *